United States Patent [19]

Mamolou

[11] Patent Number: 4,905,870
[45] Date of Patent: Mar. 6, 1990

[54] COMBINED FILTER HOUSING AND EXTRACTOR THEREFOR

[76] Inventor: Charles A. Mamolou, 5 Princeton Dr., Bordentown, N.J. 08505

[21] Appl. No.: 264,386

[22] Filed: Oct. 31, 1988

Related U.S. Application Data

[63] Continuation-in-part of Ser. No. 117,085, Nov. 5, 1987, abandoned.

[51] Int. Cl.⁴ .............................................. B65H 3/00
[52] U.S. Cl. ...................................... 221/36; 221/210; 294/1.1; 294/99.2
[58] Field of Search ...................... 221/36, 37, 40, 210, 221/213, 220, 259, 58–60; 294/1.1, 99.2, 131, 8.5, 11; 220/85 D, 85 E

[56] References Cited

U.S. PATENT DOCUMENTS

| | | | |
|---|---|---|---|
| 359,653 | 3/1887 | Wettstein | 294/131 X |
| 2,362,395 | 11/1944 | Ozdobinski | 294/99 |
| 2,396,334 | 3/1946 | Miller | 294/131 X |
| 3,031,683 | 5/1962 | Hellwig | 294/8.5 |
| 4,093,297 | 6/1978 | Reiber | 294/131 X |
| 4,121,726 | 10/1978 | Pemberton | 221/37 |
| 4,214,673 | 7/1980 | Heath et al. | 221/259 |
| 4,600,227 | 7/1986 | Ennis et al. | 294/1.1 |
| 4,605,256 | 8/1986 | Stokoe | 294/99.2 |
| 4,676,396 | 6/1987 | Mamolou | 221/36 |
| 4,698,051 | 10/1987 | Jacobson | 294/99.2 |
| 4,715,639 | 12/1987 | Nicoletta et al. | 294/99.2 |

FOREIGN PATENT DOCUMENTS 1336745  7/1963  France .............................. 220/85 D

*Primary Examiner*—Kevin P. Shaver
*Assistant Examiner*—Gregory L. Huson
*Attorney, Agent, or Firm*—Sachs & Sachs

[57] ABSTRACT

A combined filter housing for storing a plurality of filters therein and a combination cover and extractor for the stored filters includes a unitary extractor mechanism with cooperating arms removably disposed within a cover extending above and below the cover into the housing where semi-adhesive resilient members disposed on a pair of distal ends comes into contact with the stored filters. By applying pressure proximate the apex of the arms the filter is engaged by the semi-adhesive resilient member and by removing the combination cover and extractor a single filter may be removed.

9 Claims, 2 Drawing Sheets

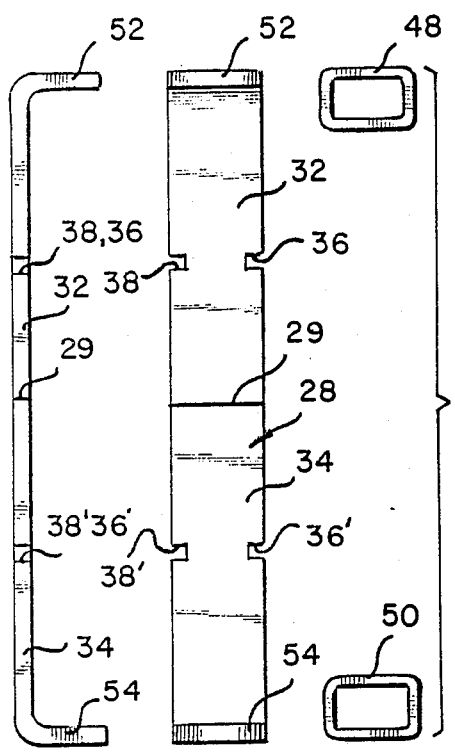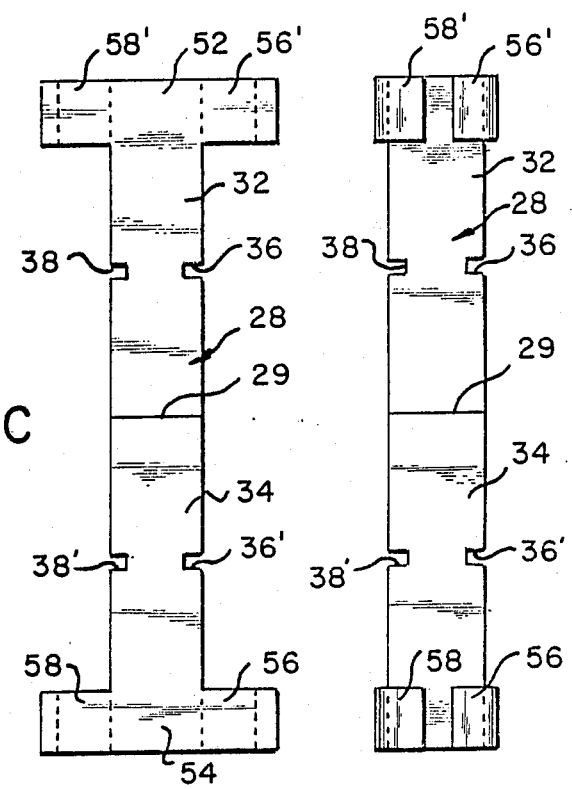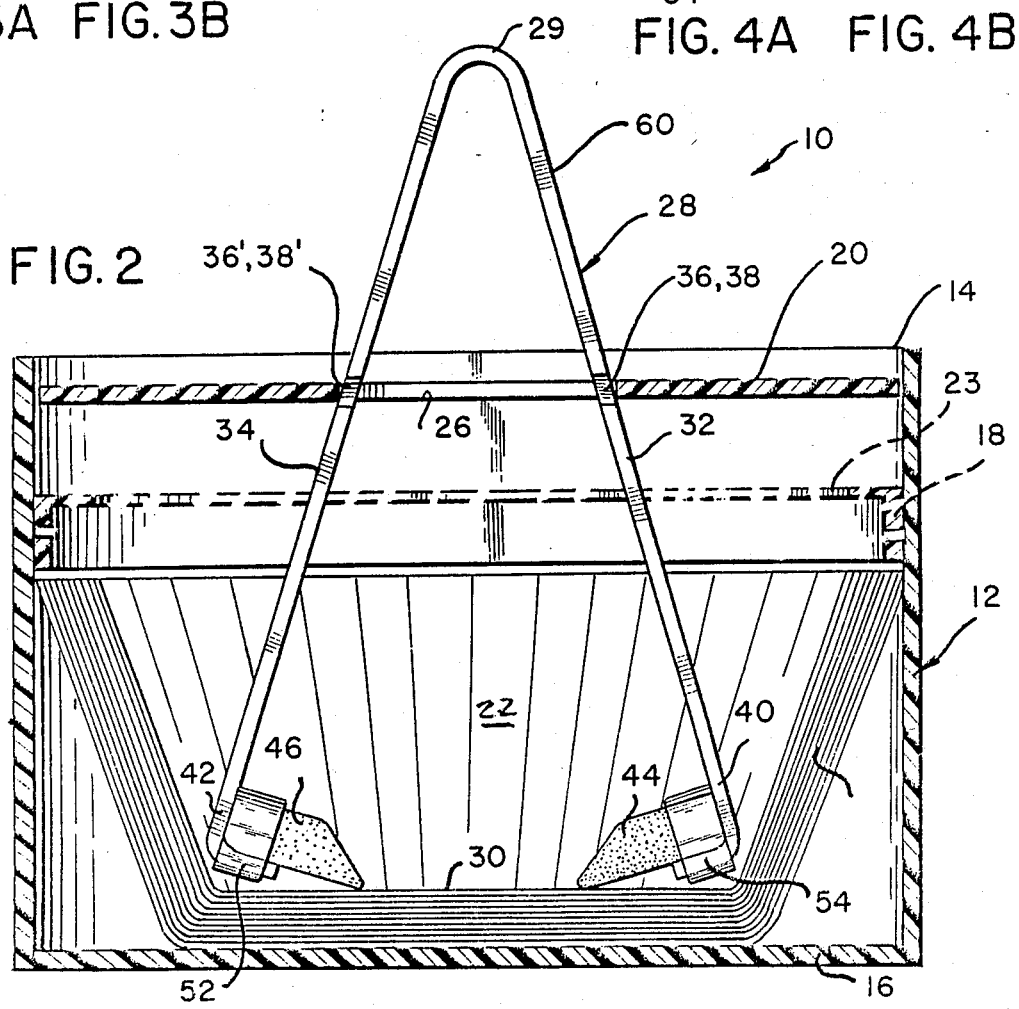

COMBINED FILTER HOUSING AND EXTRACTOR THEREFOR

This application is a continuation-in-part of application Ser. No. 117,085 filed Nov. 5, 1987 which has since been abandoned.

BACKGROUND OF THE INVENTION

1. Field of the Invention

The present invention relates to filter housings and, more particularly, to a combined filter housing and combination cover and extractor mechanism capable of removing individual filters.

2. Discussion of the Relevant Art

The Applicant is aware of several devices which are designed to store and dispense paper filters and in particular, coffee filters such as that disclosed in U.S. Pat. No. 4,093,297 issued to Reiber, June 6, 1978, U.S. Pat. No. 4,214,673 issued to Heath, et al., on July 29, 1980. as well as, the Applicant's own U.S. Pat. No. 4,676,396 issued on June 30, 1987. A plate and receptacle lifter is also disclosed in U.S. Pat. No. 2,362,395 issued to Ozdobinski, on Nov. 7, 1944. However, all these devices whether taken separately or in combination include multiple mechanical pieces, all of which must be assembled in order to provide functions similar to that of the instant invention. Each of these devices are complicated, cumbersome and expensive to produce.

The apparatus as set forth herein overcomes these shortcomings by providing a combined filter housing suitable for storing a plurality of truncated shaped filters, or the like, but is not limited to only this type, and provides a cover for the housing. Disposed in the housing cover is a removable extractor mechanism capable of readily removing a singular filter, repeatedly as required by the user thereof. All these features are achieved with a minimum of complexity and with economy of production.

Therefore, it is an object of the present invention to provide a filter housing which is capable of storing a plurality of filters and is enclosed to prevent dust and debris from accumulating on the filters.

It is a further object of the present invention to provide a relatively inexpensive, attractive, combination filter housing and removable extractor mechanism that is capable of repeatedly dispensing a single filter as required.

It is still yet another object of the present invention to provide a combination filter housing and extractor mechanism for the filters which is attractive and may also be utilized for the placement of advertising indicia thereon.

It is still yet anther object of the present invention to provide a relatively inexpensive filter housing and filter extractor mechanism which is inexpensive to manufacture and convenient to use.

SUMMARY OF THE INVENTION

A combination filter housing and extractor therefor, according to the principles of the present invention, includes a filter storage housing capable of holding a plurality of filters therein. The housing has an open end and a closed end. A cover, adapted to be received by and cooperate with the housing open end, seals the housing. The cover is provided with an opening therein in which is disposed a removable extractor device. The extractor device extends above and below the cover and is generally V-shaped and provided with a pair of resilient semi-adhesive members at the distal edges thereof. The resilient members come into contact with the filters disposed within the housing the other end of the extractor, being the apex of a V, extends above the cover and has a gripping surface provided remote from the apex. Applying pressure to the gripping portion permits the resilient semi-adhesive materials to move towards each other engaging and retaining one of the filters therebetween. Simultaneously removing the extractor with the cover while applying pressure permits a single filter to be removed from the storage housing.

The foregoing and other objects and advantages will appear from the description to follow. In the description reference is made to the accompanying drawing which forms a part hereof, and in which is shown by way of illustration a specific embodiments by which the invention may be practiced. These embodiments will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which:

FIG. 2 is an enlarged cross-sectional view of the cover containing the extractor in place upon a filter housing having a plurality of filters therein;

FIG. 3 includes a side view in elevation (3A), a plan view (3B) and an end view in elevation of a pair of holding rings (3C); and FIG. 4 includes a top plan view of an alternate embodiment of an extractor prior to folding (4A) and a top plan view of the alternative embodiment after the extending portions have been folded (4B).

DESCRIPTION OF THE PREFERRED EMBODIMENTS

Figure 1:
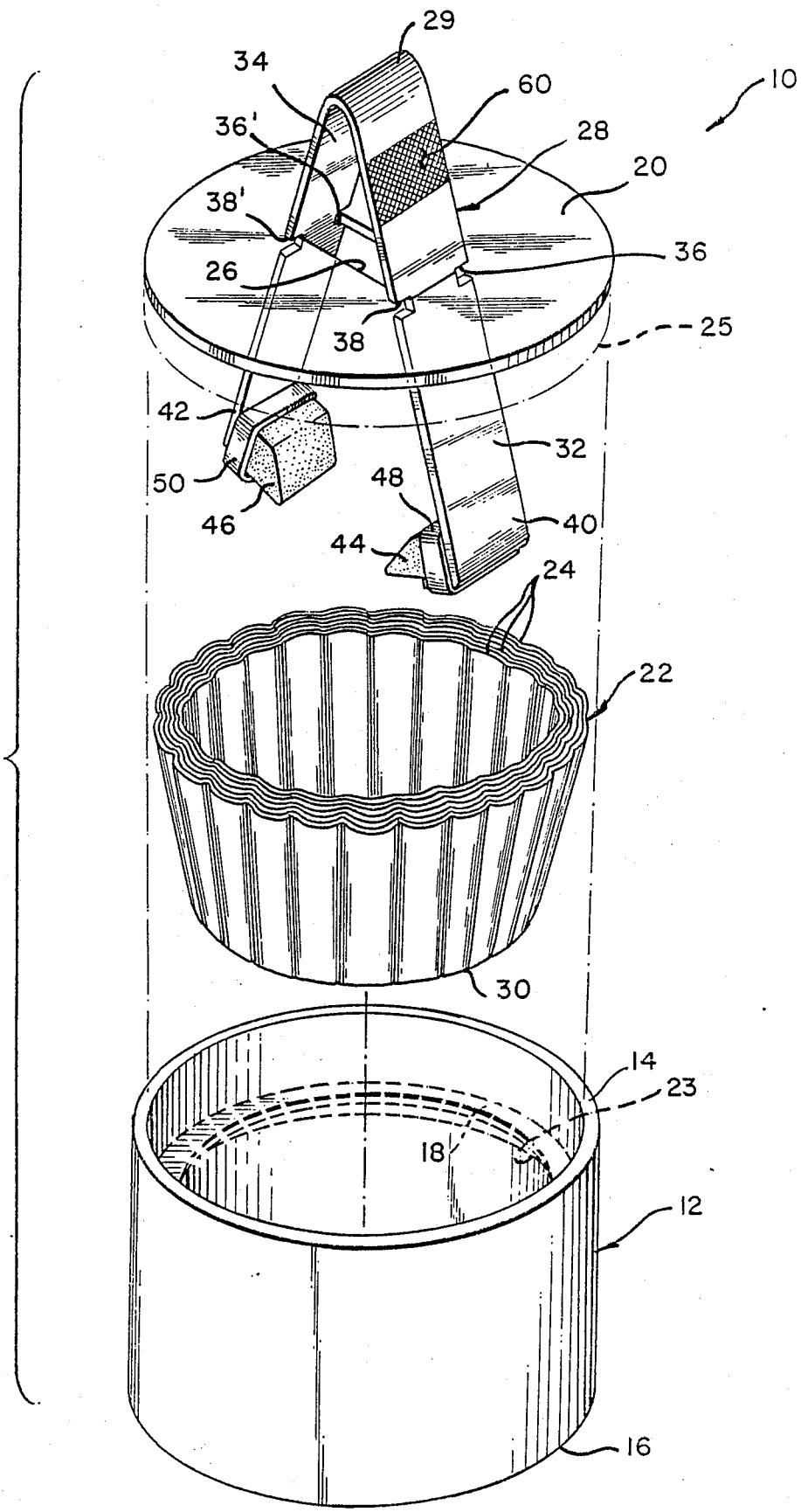
FIG. 1 is an exploded view of a combined filter housing for filters and an extractor therefor, according to the principles of the present invention.

Referring now to the figures, and in particular to FIG. 1, there is shown a combination filter storage housing and extractor mechanism 10 which preferably includes a generally cylindrically-shaped housing member 12 that has an open end 14 and a closed end 16.

Disposed proximate the open end 14 of the housing 12, is a lip member 18 (shown in broken lines) which may be included. The lip member 18 may extend inwardly about the circumference of the housing 12 and may be used to support a generally flat cover member 20 and can function to retain the filters 22 disposed within the housing 12 upon the removal of the uppermost filter as will be explained hereinafter.

The filters 22 are generally in the shape of an inverted truncated cone and are placed within the opening or cavity 23 beneath the lip 18 if used and rest upon the closed end 16 of the housing 12. The shape of these filters are well known since they have been utilized in automatic coffee makers for many years. Because of the undulations 24 provided in the filters due to the necessity of packing them into a small container and the need for them to fit into the cup portion of a coffee maker, not shown, there is severe difficulty removing one filter from a package containing a plurality of filters. An individual generally spends an inordinate amount of time in attempting to separate a single filter from the pack, especially, early in the morning when one's fingers are not apt to be as dexterous as desirable. Thus, an extractor mechanism such as that disclosed herein, should be readily received by individuals using these types of filters.

The filters 22 may be stored in the housing 12 resting upon closed end 16 in amounts equal to the standard packaging for these filters which generally run in packs of 50, 100 or 200. (Of course, the height of the lip 18 from the open end 14 would be determined at the time the housing is manufactured for the maximum amount of filters to be stored therein.) The open end 14 of the housing 12 is designed to receive the generally flat cover member 20 therein, preferably in close fitting relationship so that the cover member 20 will rest upon the circumferential edge of the uppermost filter and the filters will be completely enclosed within the housing, thus keeping it free from dirt and dust appearing in the atmosphere which may settle thereupon. An alternate embodiment includes an extending lip portion 25, shown in dotted lines in FIG. 1 extending around the periphery of cover member 20 of sufficient height to allow for the thickness of the number of filters 22 stored in the housing 12.

An opening 26 is provided in the cover member 20. Preferably, the opening is rectangularly-shaped and centrally disposed and is adapted to receive the extractor mechanism 28 therein of which the apex 29 of the V-shaped extractor mechanism 28 extends above the cover member 20 with the other distal edges extending downwardly into the housing member 12 where they come into contact with the flat portion 30 of the filters 22. The extractor member 28 is formed of a single integral member and is folded into a V-shape having a pair of identical arms 32 and 34 which are provided with slots 36 and 38; and 36, and 38,, respectively.

The arms 32 and 34 of are formed by bending a single member, preferably made of a flexible material such as plexi-glass, Lexan, stainless steel, etc., into a V-shape having an apex 29. Because of the flexibility of the material utilized for the extractor mechanism 28 the distal free ends of the arms 32 and 34 can be urged towards each other (cooperate) under finger pressure and they will assume their original configuration when the pressure is released Slots 36 and 38; and 36, and 38, formed in the arms 32 and 34, respectively cooperate with the elongated generally rectangularly-shaped opening 26 formed in the cover 20 which removably retains the extractor mechanism 28 therein while allowing the arms 32 and 34 to slidably move through their natural range of motion when urged towards each other or released. The amount the extractor mechanism is permitted to open is directly related to the longitudinal dimension of the opening 26. Removal of the extractor mechanism 28 from the cover member 20 may be readily accomplished by closing the extractor mechanism 28, rotating it 90 degrees and then pushing the apex 29 through the opening 26 of the cover member 20.

The distal ends 40 and 42 of arms 32 and 34, respectively, remote from the apex 29 are provided with semi-adhesive members 44 and 46, respectively, which, in one embodiment, are affixed unto arms 32 and 34 by means of retaining rings 48 and 50, which may be fabricated from the same material as the extractor mechanism 28 or, alternatively, may be elastic bands which cooperate with the distal ends 40 and 42, formed into an L-shape. The short ends of the L portion of each arm is bent toward each other as shown in FIG. 3A. The resilient members 44 and 46 are held on arms 32 and 34 by means of the retaining ring as is clearly shown in FIGS. 1 and 2. The retaining rings 48 and 50 circumscribe the L-shaped ends 40 and 42 and the resilient semi-adhesive material removably affixing the semi-adhesive material onto the distal ends of the arms.

In the alternative embodiment of the extractor mechanism 28 shown in FIG. 4A, the distal ends 52 and 54 of the extractor mechanism 28 are provided with extending portions 56, 58, and 56' and 58' shown in their flattened position FIG. 4A, and shown in their folded position as FIG. 4B. Once the extended portions are folded as shown, the resilient semi-adhesive members 44 and 46 may be forcibly inserted therein and with the aid of friction remain therein.

Referring now specifically to FIG. 2, there is shown a cover member 20 disposed within the housing 12, which encompasses the filters 22 and thus, protecting them from dust or other particles in the atmosphere. The cover member 20 may rest upon the uppermost filter 22 or the lip 18. The extractor mechanism 28 is shown installed in the opening 26 of the cover 20 with the slots 36 and 38 and 36, and 38, cooperating with the opening 26 and is placed in the same plane as the cover 20, thus removably retaining the extractor member 22 within the cover member 20, while permitting the movement of both arm members 32 and 34 when pressure is applied to the gripper portion 60 located remote from apex 29 on the extractor mechanism 28. With pressure applied to the gripper portion 60 the distal ends 52 and 54 of arms 32 and 34, respectively, move towards each other, and cause the semi-adhesive resilient members 44 and 46 to come together gripping the flat portion 30 of filter member 22 therebetween. Simultaneously lifting the extractor mechanism 28 together with the cover member 20 up and away from the housing member 12 causes a single filter member 22 to be removed and separated from a plurality of the filters 22 stored within the housing 12. The dimensions of opening 26 is chosen to limit the maximum opening of the distal ends 40 and 42 to the diameter of the flat portion 30 of the filters 22. The inner shape or periphery of the housing 12 is not critical and it may be fabricated with many different designs thereon suitable for display in or on a kitchen counter top or shelf and may include many different designs or indicia thereon, such as floral arrangements and advertising statements for different brands of coffee which are to be used together with the filters.

The gripper portion of the extractor mechanism 28 which protrudes out of the cover 20 may be provided with any type of grooves or serrations of a configuration suitable for receiving pressure applied by the fingers of an individual, to make it easy to apply pressure without slipping, so that the semi-adhesive resilient members 44 and 46 may engage and retain a single filter member 22.

Although it may be possible to manufacture the instant invention from several different materials all but the resilient semi-adhesive material may be fabricated from a single material, such as a hydrocarbon plastic of the type known as plexi-glass or Lexan, or may be fabricated from any spring material. The economics of the situation may readily determine the material to be utilized.

Preferably the complete apparatus may be manufactured from an injection molding process or from a single sheet material which is either punched and stamped or in any manner taken from the single unitary sheet and then formed, bent and/or sealed by applying heat, welding or adhesive in the case of a plastic. The forming of the members are conventional and require the use of well-known bending and forming equipment, not shown herein.

The housing, of course, formed either cylindrically or rectangularly shaped may readily be accomplished by means well known in the art and a base or closed in portion applied thereto as is also known. The cover 20 may be formed again of the same material with the elongated slot 26 placed therein. The extractor member mechanism 28 may be formed and bent as shown and inserted in the cover by placing the apex through the opening compressing the arms 32 and 34 toward each other and then rotating them 90 degrees when the slots 36 and 38 are in the same plane as the cover. Thus, the extractor mechanism 28 will be removably retained within the cover 20 forming an integral assembly. The lip portion 18, if utilized, may readily be inserted into the open end 14 of the storage container 12.

Hereinbefore has been disclosed an inexpensive, economical, simplified apparatus for a combined filter housing and extractor therefor. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A combined filter housing and extractor therefor, which comprises, in combination:
   A. filter storage means capable of holding a plurality of filters therein, said storage means including a hollow housing means having an open end and a closed end;
   B. a cover means adapted to be received by and cooperate with said housing means open end for sealing said housing means open end, said cover being generally flat, provided with a top surface and a bottom surface and an elongated opening therein; and
   C. a removable extractor disposed within said cover elongated opening extending above and below said cover, said extractor including;
      (i) a V-shaped member, having only a pair of arms, each of said arms being adapted to cooperate with each other by flexing under pressure, each arm of said pair of arms including;
         (a) resilient semi-adhesive material disposed at the distal end of said arm,
         (b) gripping means disposed proximate the apex of said V-shaped member, said gripping means being disposed above said cover top surface, and remote therefrom, exerting pressure on said gripping means causing each said resilient semi-adhesive material to move towards each other engaging and retaining one of said filters therebetween, and
         (c) a pair of identical slots formed in both of said arms for providing guiding reciprocating movement in a plane defined by said generally flat cover, said arm slots slidably cooperating with said cover elongated opening for removably retaining said extractor within said cover, said cover opening limiting the maximum opening of said pair of arms.

2. A combined filter housing and extractor according to claim 1 wherein said filters are generally shaped as a truncated cone.

3. A combined filter housing and extractor according to claim 1 further including a pair of removable ring means, each said ring means affixing said resilient semi-adhesive material to each one of said arms.

4. A combined filter housing and extractor according to claim 1 wherein said gripping means is provided with a surface readily responsive to receiving pressure thereon exerted by an individual.

5. A combined filter housing and extractor according to claim 1 wherein said cover is adapted to slidably cooperate with the inner walls of said housing means.

6. A combined filter housing and extractor according to claim 1 wherein said cover further includes a skirt means disposed about the perimeter of said cover, said skirt means adapted to slidably cooperate with said open end of said housing by encompassing said open end within said skirt means, the height of said skirt means being equal to at least the height of said filters disposed within said storage means.

7. A combined filter housing and extractor according to claim 1 wherein a lip means is disposed in said housing means proximate said open end for retaining said plurality of filters therein, and from which one of said filters is extracted therefrom.

8. A combined filter housing and extractor according to claim 1 wherein each said arm further includes integral means for retaining said semi-adhesive material at said distal end of each said arm.

9. A combined filter housing and extractor according to claim 8 wherein said distal end of each said arm includes extension portions adapted to wrap around said semi-adhesive material retaining it therein.

* * * * *